US012639970B2

(12) United States Patent　　　　(10) Patent No.: US 12,639,970 B2
Yamamoto et al.　　　　　　　　　　(45) Date of Patent: May 26, 2026

(54) WORK ASSISTANCE SYSTEM AND WORK ASSISTANCE METHOD

(71) Applicant: Hitachi, Ltd., Tokyo (JP)

(72) Inventors: Shoji Yamamoto, Tokyo (JP); Shingo Hayashi, Tokyo (JP); Takaaki Ueno, Tokyo (JP); Takuya Nakamichi, Tokyo (JP); Masahiko Niioka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 384 days.

(21) Appl. No.: 18/470,959

(22) Filed: Sep. 20, 2023

(65) Prior Publication Data

US 2024/0265720 A1　　Aug. 8, 2024

(30) Foreign Application Priority Data

Feb. 3, 2023　(JP) ................................. 2023-015700

(51) Int. Cl.
　　*G06V 30/32* 　　(2022.01)
　　*G06Q 10/0631* 　(2023.01)
　　*G06V 30/14* 　　(2022.01)
　　*G06V 30/18* 　　(2022.01)
　　*G06V 30/422* 　(2022.01)
(52) U.S. Cl.
　　CPC ... *G06V 30/387* (2022.01); *G06Q 10/063114* (2013.01); *G06V 30/1452* (2022.01); *G06V 30/18076* (2022.01); *G06V 30/422* (2022.01)
(58) Field of Classification Search
　　CPC ...... G06V 30/00–43; G06Q 10/063114; G06F 3/04842
　　See application file for complete search history.

(56) References Cited

U.S. PATENT DOCUMENTS

| 2014/0219564 A1* | 8/2014 | Demiya | .............. G06F 3/04883 |
| | | | 382/189 |
| 2015/0128019 A1* | 5/2015 | Ohmori | ................ G06V 30/412 |
| | | | 715/227 |
| 2016/0147434 A1* | 5/2016 | Lee | ........................ G06F 3/0482 |
| | | | 715/838 |
| 2016/0321238 A1* | 11/2016 | Kurita | ................. G06F 3/04883 |

(Continued)

FOREIGN PATENT DOCUMENTS

| JP | H06-028442 A | 2/1994 |
| JP | H09-081760 A | 3/1997 |

(Continued)

OTHER PUBLICATIONS

Office Action received in JP2023-015700, dated Jan. 6, 2026, in 6 pages (with translation).

*Primary Examiner* — Sean T Motsinger
(74) *Attorney, Agent, or Firm* — Procopio, Cory, Hargreaves & Savitch LLP

(57) ABSTRACT

A work assistance system includes a drawing, a work record table, a handwriting display determination unit, a display control unit, and input means. The drawing includes parts and handwritings. The work record table stores the handwriting for the part as the work record. The handwriting display determination unit determines, as the writing candidates, the handwritings not associated with the parts based on the work record table. The display control unit displays the writing candidates and the parts via the input means in a selectable manner on a data display unit of a terminal of a user.

14 Claims, 21 Drawing Sheets

(56) References Cited

U.S. PATENT DOCUMENTS

| | | | |
|---|---|---|---|
| 2016/0321516 A1* | 11/2016 | Maltun | G06T 7/60 |
| 2017/0169290 A1* | 6/2017 | Held | G06F 18/22 |
| 2021/0150122 A1* | 5/2021 | Nakano | G06F 16/3334 |
| 2021/0182546 A1* | 6/2021 | Tsuji | G06F 3/04883 |
| 2021/0294965 A1* | 9/2021 | Tsuji | G06F 3/04842 |
| 2024/0303024 A1* | 9/2024 | Li | G06F 3/04817 |

FOREIGN PATENT DOCUMENTS

| | | | |
|---|---|---|---|
| JP | 2022-42598 A | | 3/2022 |
| JP | 2022042598 A | * | 3/2022 |

* cited by examiner

| HANDWRITING NO. | HANDWRITING START POINT IN TIME | DEVICE ID (USER INFORMATION) | HANDWRITING ATTRIBUTE | | | | POINT GROUP COORDINATES |
|---|---|---|---|---|---|---|---|
| | | | COLOR | SIZE | TRANSMITTANCE | TYPE | |
| HANDWRITING 115 | yyyy/mm/dd 10:08:30 | 85001 | RED | 6 pt | 40% | MARKER | [STROKE 1] |
| HANDWRITING 116 | yyyy/mm/dd 10:10:32 | 85001 | RED | 6 pt | 40% | MARKER | [STROKE 2] |
| HANDWRITING 117 | yyyy/mm/dd 10:07:20 | 85001 | BLACK | 2 pt | 0% | PEN | [STROKE 3] |
| HANDWRITING 118 | yyyy/mm/dd 10:07:20 | 85001 | BLACK | 2 pt | 0% | PEN | [STROKE 4] [STROKE 5] |
| ... | ... | ... | ... | ... | ... | ... | ... |

*FIG. 8*

| PART TYPE | PART NAME | COORDINATES | POINT IN TIME | HANDWRITING ID | ORDER | DEVICE ID |
|---|---|---|---|---|---|---|
| CHARACTER | AA | (20,40) | | | | |
| DRAWING SYMBOL | Parts_A | (50,20) | 10:07:20 | HANDWRITING 116 | 1 | 85001 |
| WIRING | Line_1 | (30,20) | | | | |

⇒

| PART TYPE | PART NAME | COORDINATES | POINT IN TIME | HANDWRITING ID | ORDER | DEVICE ID |
|---|---|---|---|---|---|---|
| CHARACTER | AA | (20,40) | 10:08:30 | HANDWRITING 114 | 2 | 85001 |
| DRAWING SYMBOL | Parts_A | (50,20) | 10:07:20 | HANDWRITING 116 | 1 | 85001 |
| WIRING | Line_1 | (30,20) | | | | |

FIG. 10

CHARACTER INFORMATION

| CHARACTER No. | NAME | COORDINATES (START POINT, END POINT) | CHARACTER STRING DIRECTION |
|---|---|---|---|
| 1 | AB01Δ | [(7,254), (167,289)] | x DIRECTION |
| 2 | Sheet No. AB001 | [(185,243), (312,301)] | x DIRECTION |
| 3 | CONNECTION DRAWING | [(235,2), (272,200)] | y DIRECTION |
| ⋮ | ⋮ | ⋮ | ⋮ |

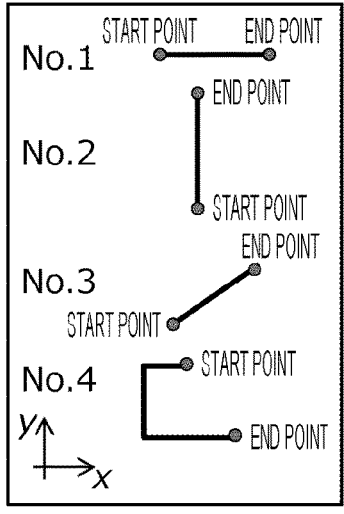

WIRING INFORMATION

| WIRING No. | NAME | COORDINATES (START POINT, END POINT) | CONFIGURATION OF WIRING INFORMATION [LINE 1, ..., LINE N] |
|---|---|---|---|
| 1 | WIRING AB | [(0,500), (50,500)] | [(0,500), (50,500)] |
| 2 | WIRING CD | [(40,300), (40,400)] | [(40,300), (40,400)] |
| 3 | WIRING E3 | [(10,150), (45,175)] | [(10,150), (45,175)] |
| 4 | WIRING F12 | [(25,75), (50,0)] | [(5,75), (25,75)], [(5,0), (5,75)], [(5,0), (50,0)] |
| ⋮ | ⋮ | ⋮ | ⋮ |

DRAWING SYMBOL INFORMATION

| DRAWING SYMBOL No. | NAME | COORDINATES (START POINT, END POINT) | CONNECTION DIRECTION WITH WIRING |
|---|---|---|---|
| 1 | CIRCUIT BREAKER | [(50,240), (135,300)] | x DIRECTION |
| 2 | SWITCHING SWITCH | [(148,234), (366,333)] | y DIRECTION |
| 3 | IC | [(123, 27), (328, 125)] | x-y DIRECTION |
| ⋮ | ⋮ | ⋮ | ⋮ |

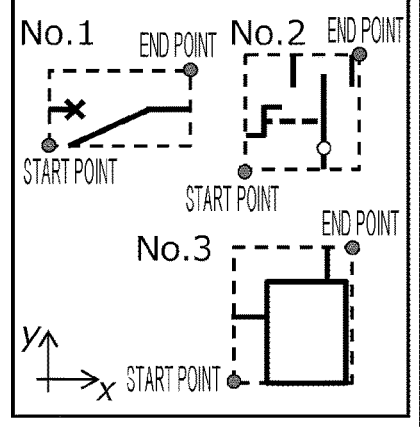

230

231

WORK COMPLETION
DETERMINATION UNIT

232

PART-RELATED HANDWRITING
EXTRACTION UNIT

PARTS_A          13
                 116
1        8       BB
2        7
DD
3        6
4        5

BEFORE
PROCESSING

PARTS_A          13
1        8       BB
2        7
DD
3        6
4        5

AFTER
PROCESSING

| PART TYPE | PART NAME | COORDINATES | POINT IN TIME | HANDWRITING ID (CANDIDATE HANDWRITING ID, ORDER, DISTANCE) | ORDER | DEVICE ID |
|---|---|---|---|---|---|---|
| CHARACTER | AA | (20,40) | | (HANDWRITING 114,1,10) | | |
| DRAWING SYMBOL | Parts_A | (50,20) | 10:07:20 | HANDWRITING 116 | 1 | 85001 |
| WIRING | Line_1 | (30,20) | | | | |

*FIG. 22*

| HANDWRITING NO. | HANDWRITING START POINT IN TIME | DEVICE ID (USER INFORMATION) | HANDWRITING ATTRIBUTE | | | | POINT GROUP COORDINATES | ASSOCIATION TARGET |
|---|---|---|---|---|---|---|---|---|
| | | | COLOR | SIZE | TRANSMITTANCE | TYPE | | |
| HANDWRITING 114 | yyyy/mm/dd 10:08:30 | 85001 | RED | 6 pt | 40% | MARKER | [STROKE 1] | CHARACTER, DRAWING SYMBOL |
| HANDWRITING 115 | yyyy/mm/dd 10:10:32 | 85001 | RED | 6 pt | 40% | MARKER | [STROKE 2] | ALL |
| HANDWRITING 116 | yyyy/mm/dd 10:07:20 | 85001 | BLACK | 2 pt | 0% | PEN | [STROKE 3] | — |
| HANDWRITING 112 | yyyy/mm/dd 10:12:20 | 85001 | RED | 6 pt | 40% | MARKER | [STROKE 4] | WIRING |
| ... | ... | ... | ... | ... | ... | ... | ... | |

HANDWRITING 118

HANDWRITING 119

FIG. 24

| PART TYPE | PART NAME | COORDINATES | POINT IN TIME | HANDWRITING ID | ORDER | DEVICE ID |
|---|---|---|---|---|---|---|
| CHARACTER | AA | (20,40) | | | | |
| DRAWING SYMBOL | Parts_A | (50,20) | 10:07:20 | HANDWRITING 116 | 1 | 85001 |
| WIRING | Line_1 | (30,20) | | | | |

⇒

| PART TYPE | PART NAME | COORDINATES | POINT IN TIME | HANDWRITING ID | ORDER | DEVICE ID |
|---|---|---|---|---|---|---|
| CHARACTER | AA | (20,40) | 10:08:30 | (COMMENT) HANDWRITING 119 | 2 | 85001 |
| DRAWING SYMBOL | Parts_A | (50,20) | 10:07:20 | HANDWRITING 116 | 1 | 85001 |
| WIRING | Line_1 | (30,20) | | | | |

WORK ASSISTANCE SYSTEM AND WORK ASSISTANCE METHOD

CROSS-REFERENCE TO PRIOR APPLICATION

This application relates to and claims the benefit of priority from Japanese Patent Application No. 2023-015700 filed on Feb. 3, 2023, the entire disclosure of which is incorporated herein by reference.

BACKGROUND OF THE INVENTION

1. Field of the Invention

The present invention relates to a work assistance system.

2. Description of the Related Art

In recent years, digitization at a work site has accelerated, and a work using a portable terminal for inputting work information has become widespread. A worker performs a work record of the corresponding portion on the portable terminal by handwriting similarly to a paper work of the related art. On the other hand, in order to grasp whether the worker has performed the work on the corresponding portion, an administrator side collects worker data in a system on the administrator side, accumulates the worker data in a server, analyzes the worker data, and effectively utilizes necessary data. In order to associate whether the corresponding portion has been worked, it is necessary to perform association with a work record of the handwriting. However, JP 2022-42598 A discloses that an answer sheet is read by a scanner, the read image data is analyzed, and a question symbol and a handwritten character string are associated by using question symbol information and handwritten character string information.

SUMMARY OF THE INVENTION

JP 2022-42598 A describes that association information is generated in accordance with a distance when the question symbol and the handwritten character string are associated with each other. However, in a work on a drawing including a circuit symbol or the like whose format is not confirmed, there is a possibility that a work record of a target handwriting is performed on an upper side, a left side, or a lower side where the question symbol is not assumed. In order to accurately associate the question symbol with a distance of the handwriting, it is necessary to perform calculation in consideration of the question symbol and a region of the handwriting. However, JP 2022-42598 A does not mention distance calculation in consideration of the question symbol and the region of the handwriting.

Therefore, the present invention has been made in view of the above problems, and an object thereof is to provide a technique for suppressing an erroneous operation of an association work by a user.

In order to solve the above object, the present invention includes a work assistance system including a drawing in which parts and handwritings are included, a work record table that stores, as work records, the handwritings for the parts, a handwriting display determination unit that determines that the handwritings not associated with the parts are writing candidates based on the work record table, and a display control unit that displays the writing candidates and the parts on a display unit of a terminal of a user. The display control unit displays, as the writing candidates to be associated with the part, the writing candidates and the parts in a selectable manner on the display unit of the terminal of the user.

According to the present invention, it is possible to suppress an erroneous operation by a user.

BRIEF DESCRIPTION OF THE DRAWINGS

FIG. 1 is a diagram illustrating a drawing of a first embodiment;

FIG. 2 is a diagram illustrating an example in which a worker records a work by a handwriting on a drawing;

FIG. 4 is a diagram illustrating a point group coordinate example of a check mark of the handwriting;

FIG. 5 is a diagram illustrating handwriting information retained as data by each handwriting;

FIG. 8 is a diagram illustrating a work record table after the handwriting and the part are associated with each other;

FIG. 10 is a diagram illustrating details of a part data table;

FIG. 13 is a diagram illustrating screen display to be presented to the user after the processing of the work completion determination unit;

FIG. 16 is a diagram illustrating information of the work record table after processing is performed by the handwriting display determination unit;

FIG. 22 is a diagram illustrating a handwriting internal table;

FIG. 23 is a diagram illustrating an example in which a comment is written on a character by a lead line; and FIG. 24 is a diagram illustrating a work record table reflecting a comment.

DESCRIPTION OF THE PREFERRED EMBODIMENTS

Figure 3:
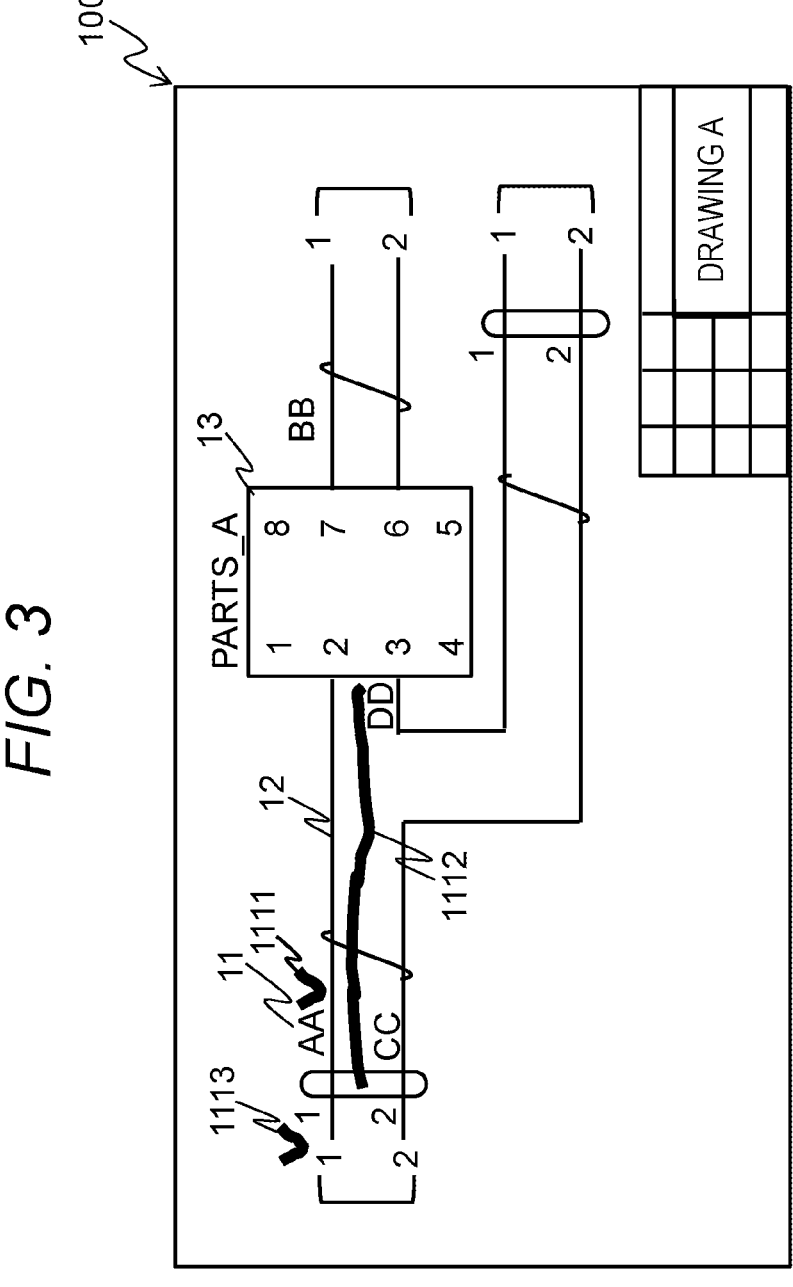
FIG. 3 is a diagram illustrating a work record example of the handwriting.

Hereinafter, a specific example of a work assistance system according to an embodiment of the present invention will be described with reference to the drawings. Note that, the present invention is not limited by embodiments, but is indicated by the claims. The work assistance system according to the present embodiment displays, on a display unit of a terminal of a user, write candidates and a part as writing to be associated with the part in a selectable manner. According to the present embodiment, the user can appropriately select the writing to be associated with the part from among the write candidates, and an erroneous operation by the user can be suppressed.

First Embodiment

Figure 1:
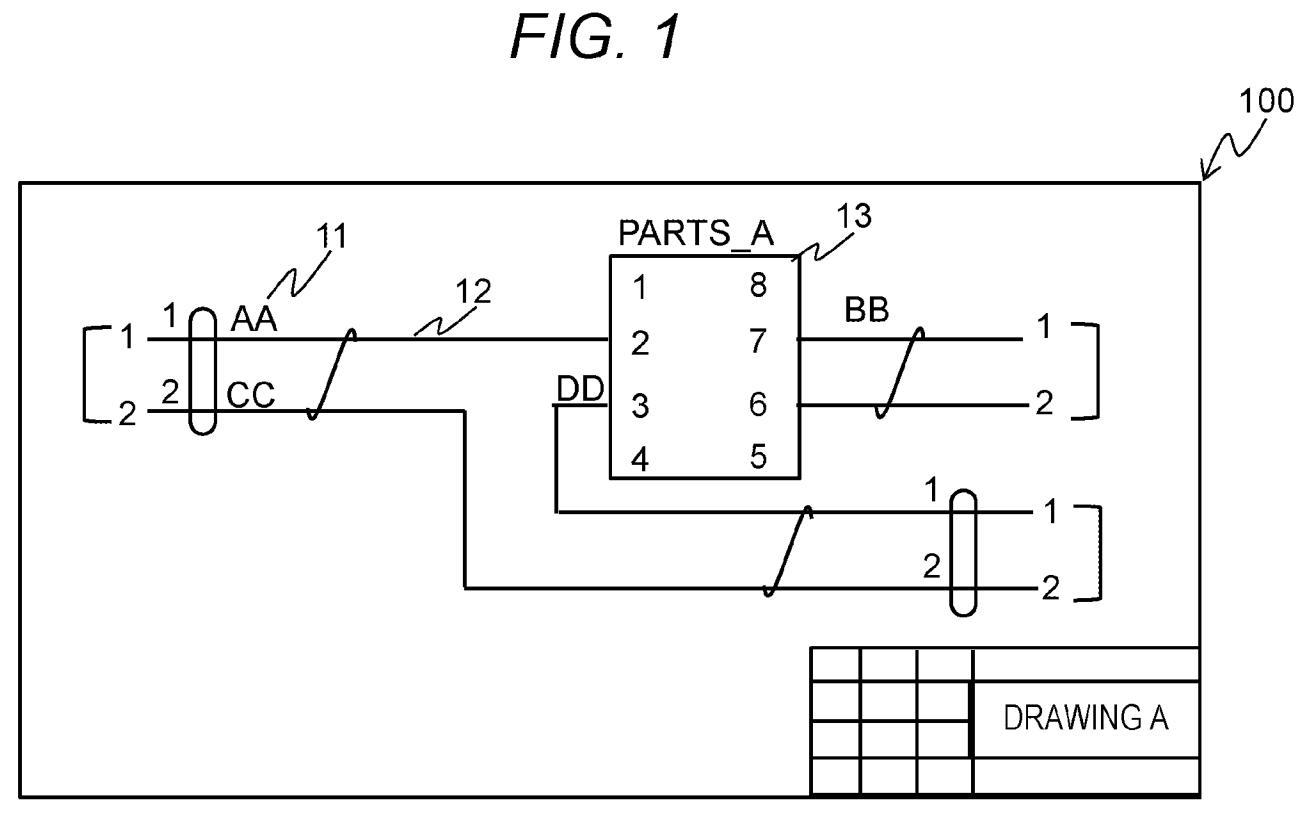

FIG. 1 is a diagram illustrating a drawing of a first embodiment.

In a drawing 100 displayed on the terminal of the user, three types of parts of a character 11, a wiring 12, and a drawing symbol 13 as examples of "part" are described. In FIG. 1, numbers are assigned to the parts one by one, and a plurality of parts are included in the drawing 100. In the drawing 100, the wiring 12 and the drawing symbol 13 are connected, and a circuit diagram illustrating an electrical flow is taken as an example.

Figure 2:
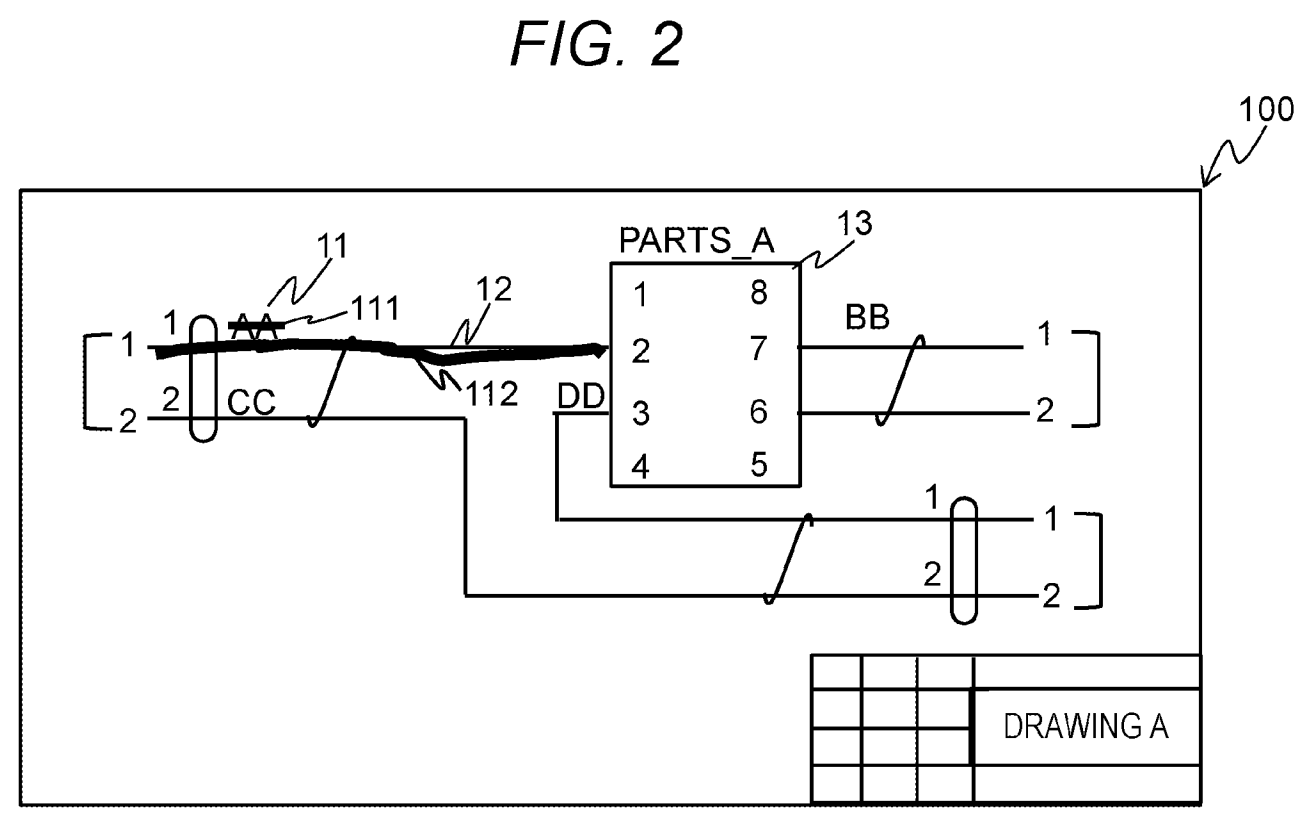

FIG. 2 is a diagram illustrating an example in which a worker records a work by handwriting on the drawing.

In the drawing 100, a handwriting 111 as a work record on the character 11 and a handwriting 112 as a work record on the wiring 12 are described by the worker as an example of "user" (hereinafter, also referred to as a user). That is, the handwritings 111 and 112 are work records in which the worker performs electronic handwritings at any positions on the drawing 100. The work record is performed, for example, in a case where the worker confirms a wiring name described on an actual wiring for the character 11 indicating a wiring name and the confirmed wiring name matches the character 11 described on the drawing 100. Further, in a case where the worker measures a voltage or a resistance value on the wiring 12 and observes a desired voltage or resistance value, handwriting is performed as a work record for the wiring 12. As described above, the worker confirms an actual real object and electrical characteristics, and performs the work record by handwriting in a case where a desired result is obtained.

FIG. 3 is a diagram illustrating a work record example of handwriting.

A significant difference from the example of FIG. 2 is that handwriting is not performed on the part. A work record of the character 11 is assigned in such a manner that a handwriting 1111 is checked on a right side of the character 11. As a work record of the wiring 12, a handwriting 1112 is assigned at a position greatly away to a lower side of the wiring 12. Further, there is a case where it is unclear which character's work record in the periphery of a handwriting 1113 is. In the present embodiment, a handwriting such as the handwriting 1111 or the handwriting 1113 that is not associated with the part and is present in a peripheral portion of the part is also referred to as a writing candidate. The handwriting is preferably present near a part assumed to be a recording target. However, in a case where the part and the handwriting are separated from each other, it is not clear which part was recorded, and it is very difficult to perform automatic association processing on the part with the handwriting in order to grasp an intention of the worker and leave an accurate evidence of the work record of the part. Therefore, in order to leave the accurate evidence, a mechanism in which the user who themselves has performed the work can associate parts with handwritings on a user interface (UI) is effective.

Figure 4:
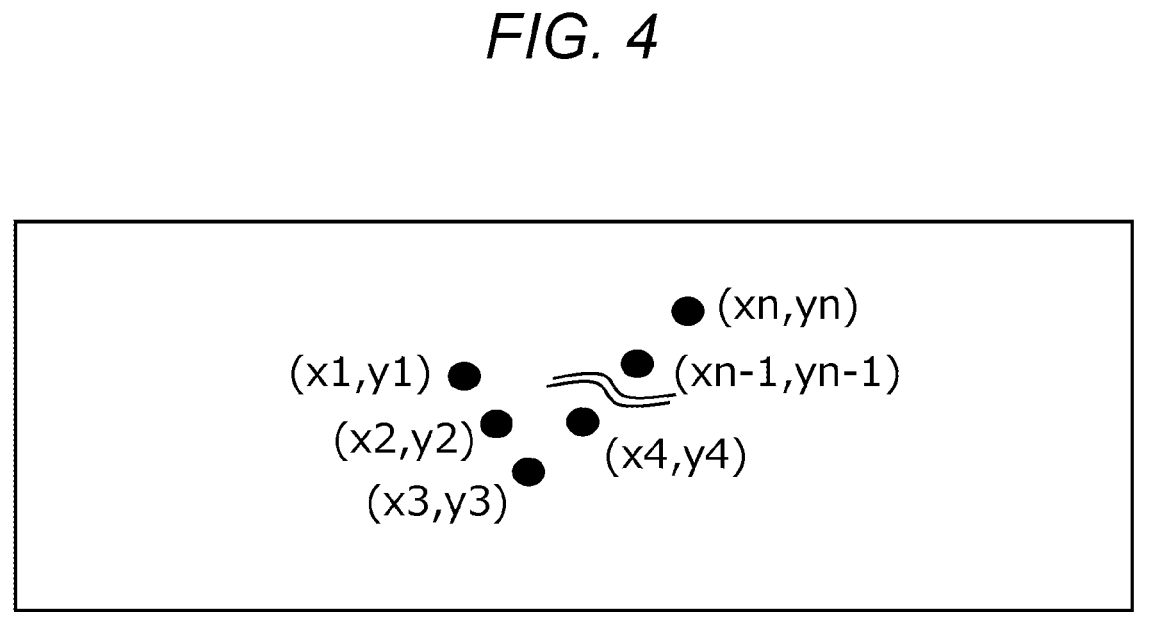

FIG. 4 is a diagram illustrating point group coordinates of check marks of handwritings, and FIG. 5 is a diagram illustrating handwriting information retained as data by each handwriting.

The handwriting is expressed by a collection of point groups. In FIG. 4, the handwriting includes n points of (x1, y1) to (xn, yn). The handwriting is associated with the part by using the point group. Further, each handwriting has the handwriting information in FIG. 5, and the handwriting information includes a point in time at which the handwriting is started, a device ID indicating written user information, a color, a thickness, a transmittance, and a type as attributes of the handwriting, and the point group coordinates illustrated in FIG. 4. The point group coordinates have, as a reference, a stroke written with one stroke. However, strokes written within a certain time after one stroke are managed as the same handwriting. This is because handwriting is recognized as one set in a case where a comment or the like is described.

Figure 6:
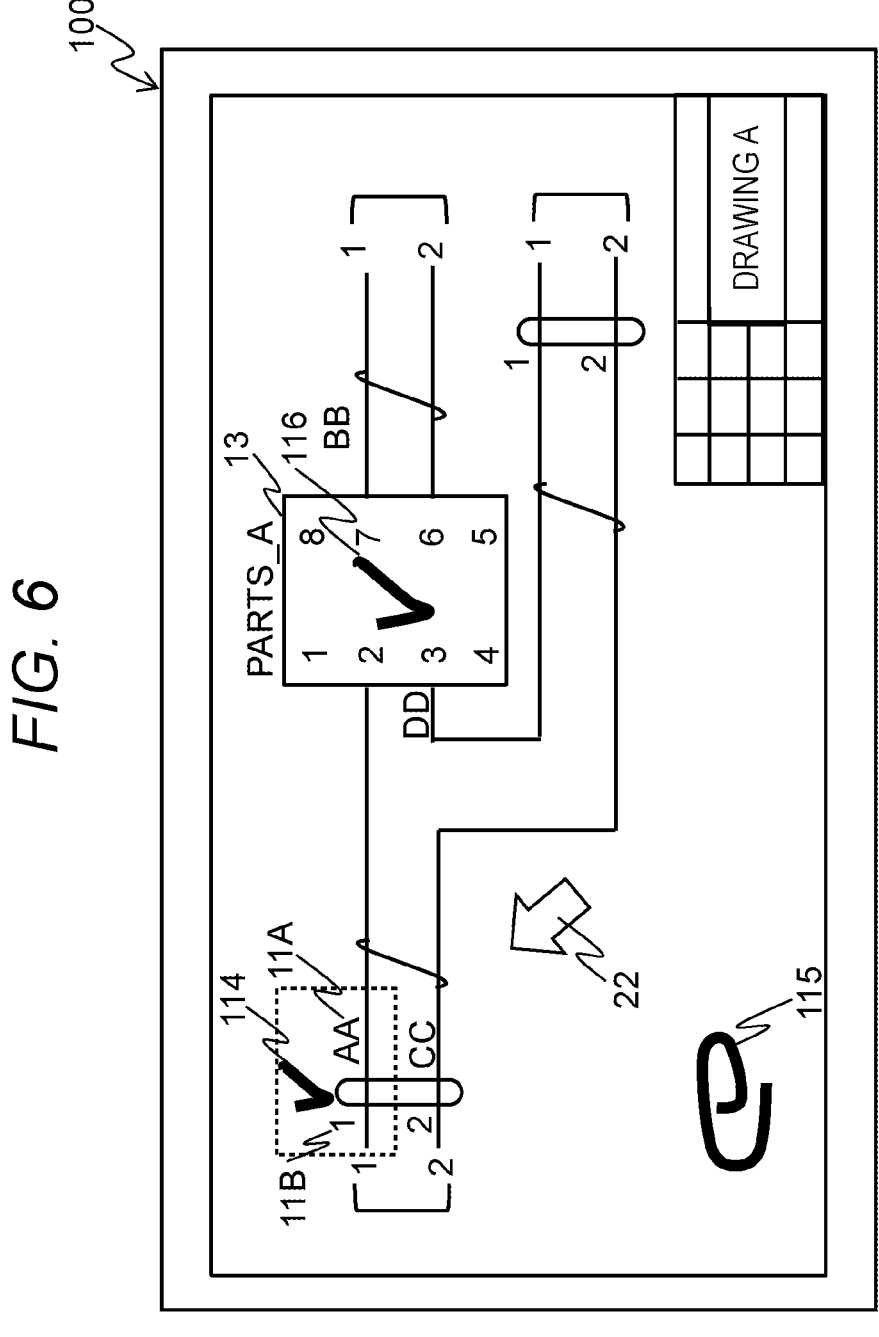
FIG. 6 is a diagram illustrating a screen on a UI on which the worker associates parts with handwritings.

FIG. 6 is a diagram illustrating a screen on a UI on which the worker associates parts with handwritings.

In the drawing 100 displayed on the terminal of the user, three handwritings of a handwriting 114, a handwriting 115, and a handwriting 116 are written. Further, a pointer 22 is disposed such that the user can select a handwriting and a part on the UI. The user can freely move the pointer 22 on the screen by a mouse operation or a keyboard operation. The handwriting 116 is described on the drawing symbol 13 and is associated with the drawing symbol 13. However, the handwriting 114 and the handwriting 115 are not written on the parts. The user selects which of a character 11A or a character 11B is associated with the handwriting 114, and associates the handwriting not on the part with the part.

Next, means by which the user associates the handwriting with the part on the UI will be described.

Figure 7:
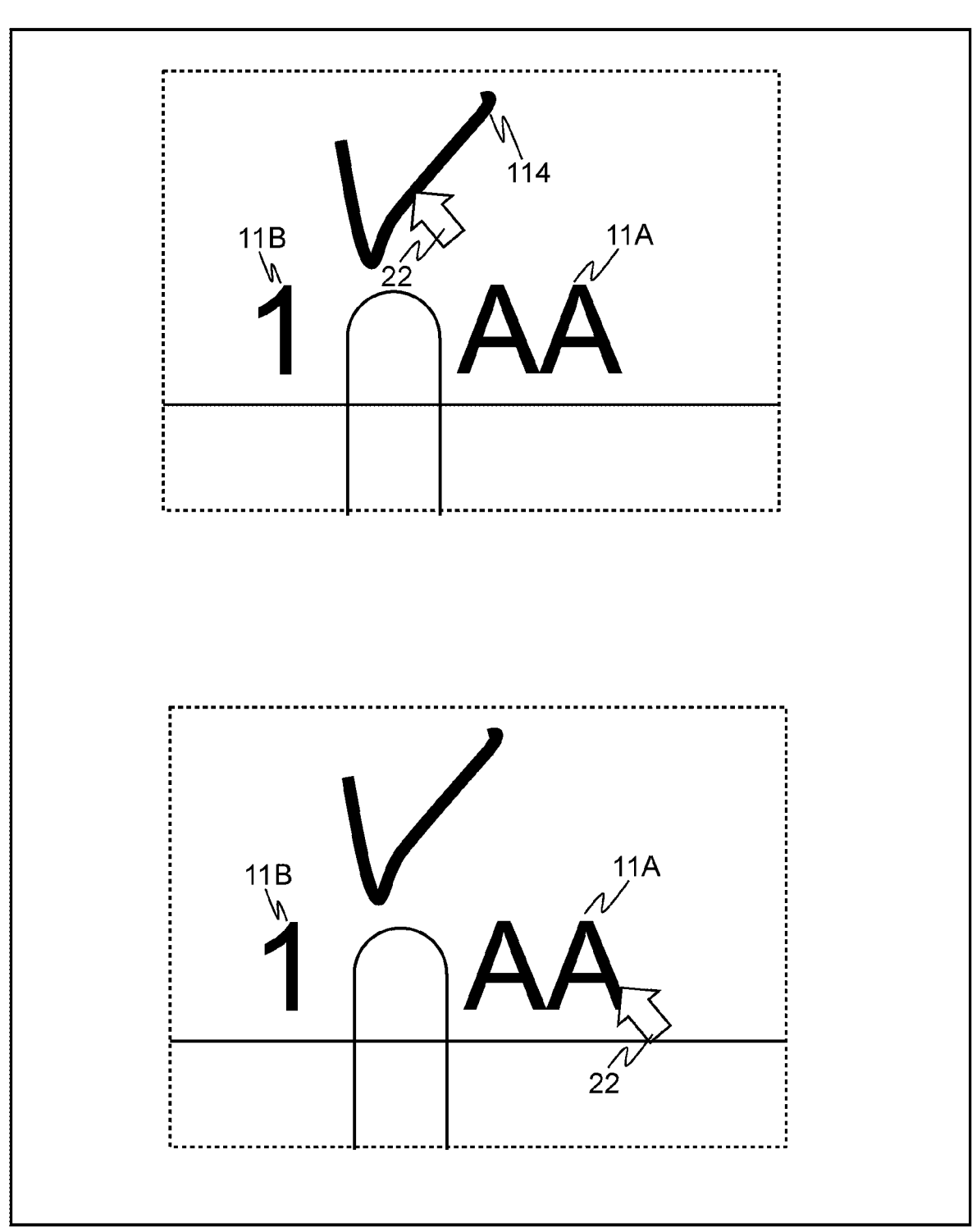
FIG. 7 is an enlarged view of a portion surrounded by a dotted line portion in FIG. 6.

FIG. 7 is an enlarged view of a portion surrounded by a dotted line in FIG. 6. An upper side is an enlarged view of the periphery of the handwriting 114 and illustrates a handwriting selection operation by the user, and a lower side is a diagram illustrating a part selection operation by the user.

The user moves the pointer 22 by a mouse operation or the like to select the handwriting 114. After the selection, the character 11A to be associated is selected. This operation is performed by the user themselves who has performed the work. Thus, the handwriting and the part are associated with each other, and the evidence is accurately left.

FIG. 8 is a diagram illustrating a work record table after the handwriting and the part are associated with each other. An upper side indicates a work record before association, and a lower side indicates a work record after association by the user.

The work record table stores the handwriting for the part as the work record. For example, the operation described with reference to FIG. 7 is performed, and thus, information on the handwriting is assigned to a row corresponding to the character 11A in a work record table 213. Here, a point in time, a handwriting ID, a work order calculated from the point in time, and the device ID are assigned. However, when there is a necessary item in the handwriting information, the item may be added.

With the above mechanism, it is possible to leave an accurate evidence by the user reflecting the intention of the user themselves and associating the handwriting with the part. However, since the operation is performed by the user themselves, there is a possibility that association due to an unintended erroneous operation occurs, and it is desirable to provide a UI in which an unintended erroneous operation is unlikely to occur in order to further accurately associate the handwriting with the part. Therefore, in the present embodiment, display is limited to only the handwriting having a possibility of being associated with the part, and thus, a UI that does not cause an unintended erroneous operation and is easily associated by the user is provided.

Figure 9:
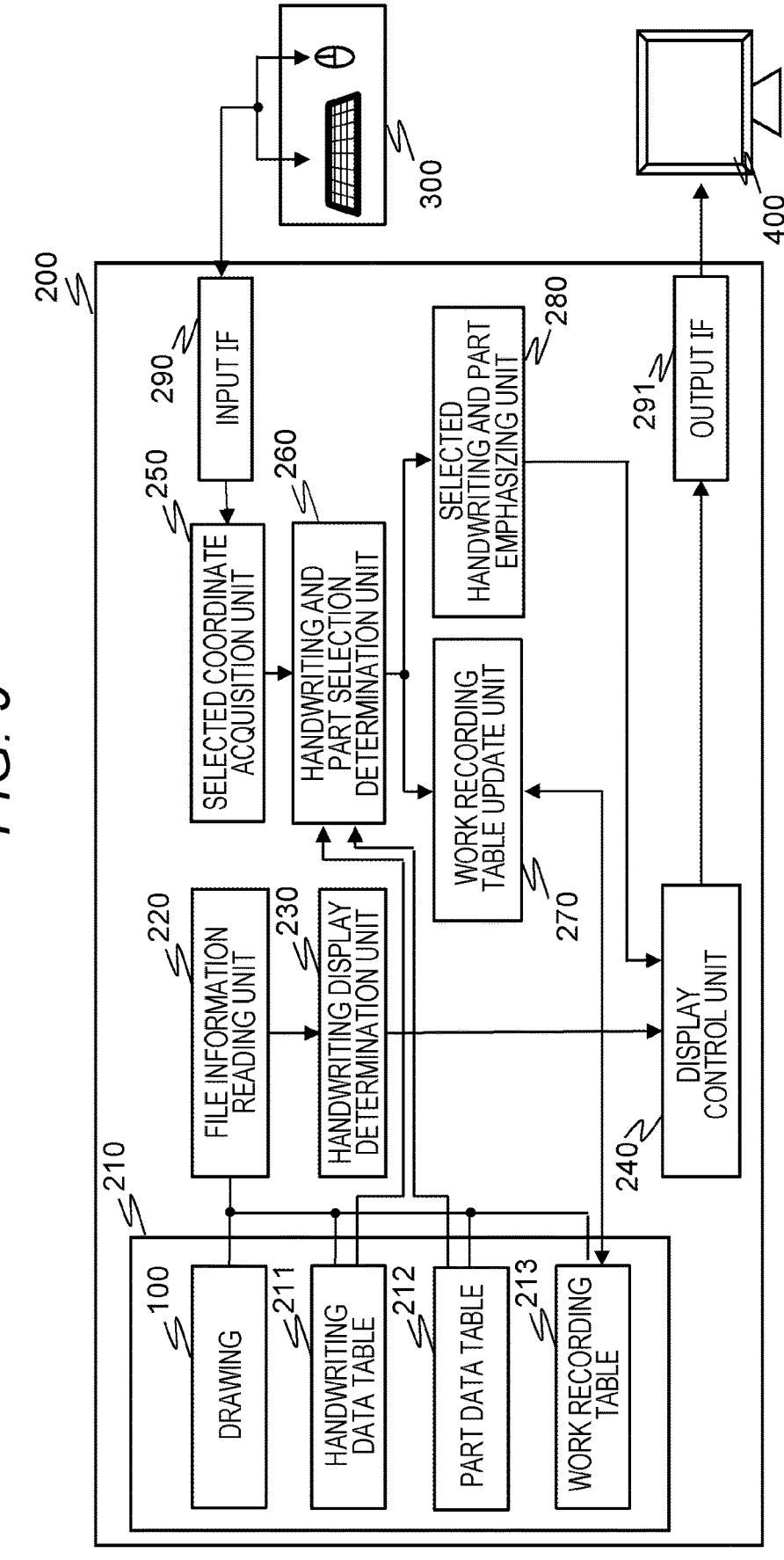
FIG. 9 is a diagram illustrating a configuration of a work assistance system.

FIG. 9 is a diagram illustrating a configuration of the work assistance system.

First, a configuration of a work assistance system 200 will be described.

The work assistance system 200 includes a data storage unit 210, a file information reading unit 220, a handwriting display determination unit 230, a display control unit 240, a selected coordinate acquisition unit 250, and a handwriting and part selection determination unit 260. Further, the work assistance system 200 further includes a work record table update unit 270, a selected handwriting and part emphasizing unit 280, an input IF 290, an output IF 291, input means 300 as an example of "input unit", and a data display unit 400 as an example of "display unit". The data storage unit 210 includes the drawing 100, a handwriting data table 211, a part data table 212, and a work record table 213.

Next, an operation of the work assistance system 200 will be described.

The file information reading unit 220 reads data of the drawing 100, the handwriting data table 211, the part data table 212, and the work record table 213 in the data storage unit 210. The file information reading unit 220 captures the drawing 100 as a PDF or an image in order to generate an input screen of the user. From the information of the handwriting data table 211, the part data table 212, and the work record table 213, the file information reading unit 220 displays a part already having a work record in an emphasizing manner, that is, a part associated with a handwriting on the data display unit 400. The display in the emphasizing manner may be a method for filling an inside of a bounding box of the part with color or a method for coloring a frame. Any part may be used as long as the part is noted differently from other parts and it can be understood that the work has been recorded on the part.

The handwriting display determination unit 230 determines that a handwriting that is not associated with a part and is present in a peripheral portion of the part is a writing candidate based on the work record table 213. Specifically, the handwriting display determination unit 230 select a handwriting to be presented to the user by using data read by the file information reading unit 220. The display control unit 240 displays writing candidates and parts on the data display unit 400 of the terminal of the user. That is, the display control unit 240 displays the writing candidates and the parts as writing to be associated with the part in a selectable manner on the data display unit 400 of the terminal of the user. Specifically, the display control unit 240 generates display data to be displayed to the user by the data display unit 400 based on the handwriting, the part data, and the work record data selected by the handwriting display determination unit 230.

Next, processing of a user operation on the displayed UI will be described. The user selects the handwriting or the part by the input means 300. After the selection, the selected coordinate acquisition unit 250 acquires a coordinate position selected by the pointer 22. The handwriting and part selection determination unit 260 specifies the handwriting or the part corresponding to the coordinates acquired by the selected coordinate acquisition unit 250 by using the data of the handwriting data table 211 and the part data table 212. Thereafter, in order to clearly indicate the selected handwriting or part to the user by the data display unit 400, the handwriting and part selection determination unit 260 sends data of the specified handwriting or part to the selected handwriting and part emphasizing unit 280, performs emphasizing processing by the selected handwriting and part emphasizing unit 280, and outputs the data to the display control unit 240. When both the handwriting and the part are selected by the user, the handwriting and part selection determination unit 260 sends the handwriting data and the part data corresponding to the work record table update unit 270. The work record table update unit 270 that has received the data updates the work record table 213 by writing the information on the handwriting to the corresponding part in the work record table 213. The operation of the work assistance system 200 has been described above.

Next, each component of the work assistance system 200 will be described.

FIG. 10 is a diagram illustrating details of the part data table.

An upper part illustrates character information, a middle part illustrates wiring information, and a lower part illustrates drawing symbol information. Each of the character, the wiring, and the drawing symbol includes an index of "No.", a name, and coordinates including a start point and an end point. In addition, the character includes information (character string direction) indicating in which direction of an x direction or a y direction the character of the character string is written. For example, information indicating the x direction when the characters are written horizontally and the y direction when the characters are written vertically is included. The wiring may include one line, and is represented by the coordinates of the start point and the end point. However, in a case where the wiring is, for example, a U shape including a plurality of lines, the start point and the end point of each line are included as a configuration of the wiring information. The drawing symbol includes information (connection direction with the wiring) indicating which of the x direction and the y direction is connected to the wiring, including electrical input and output directions.

Figures 11, 12:
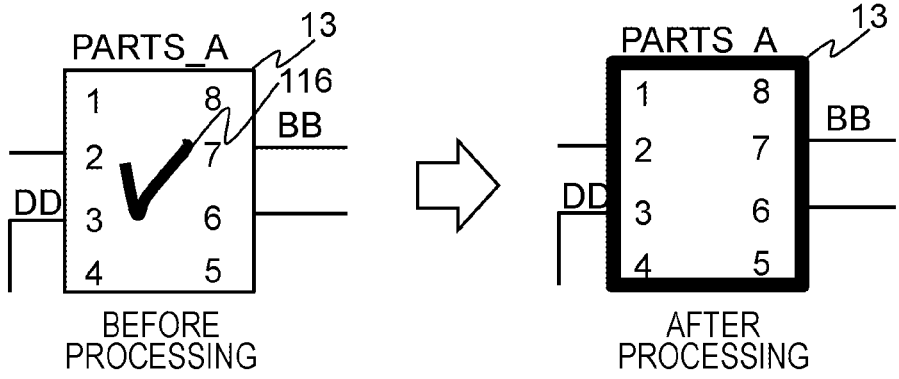
FIG. 11 is a diagram illustrating internal blocks of a handwriting display determination unit.
FIG. 12 is a diagram illustrating a screen example to be presented to a user after processing of a work completion determination unit.

FIG. 11 is a diagram illustrating internal blocks of the handwriting display determination unit.

The handwriting display determination unit 230 includes a work completion determination unit 231 and a part-related handwriting extraction unit 232.

First, a function of the work completion determination unit 231 will be described.

The information of the handwriting data table 211, the part data table 212, and the work record table 213 output from the file information reading unit 220 and screen information to be presented to the user are input to the work completion determination unit 231. The work completion determination unit 231 determines whether or not the work of the part is completed based on the information on the part in the work record table 213. The handwriting associated with the part for which the work is completed is deleted from the screen information to be presented to the user.

FIG. 12 is a diagram illustrating a screen example to be presented to the user after processing of the work completion determination unit.

A left side illustrates a screen information example to be presented to the user before processing by the work completion determination unit 231, and a right side illustrates a screen information example to be presented to the user after processing by the work completion determination unit 231.

The work completion determination unit 231 deletes, after the processing, the handwriting 116 on the drawing symbol 13 before the processing. This processing prevents the user from erroneously selecting the already associated handwriting. Further, in this example, the file information reading unit 220 performs processing of displaying the drawing symbol 13 in the emphasizing manner, here, thickening a frame.

Next, a function of the part-related handwriting extraction unit 232 will be described.

Figure 13:
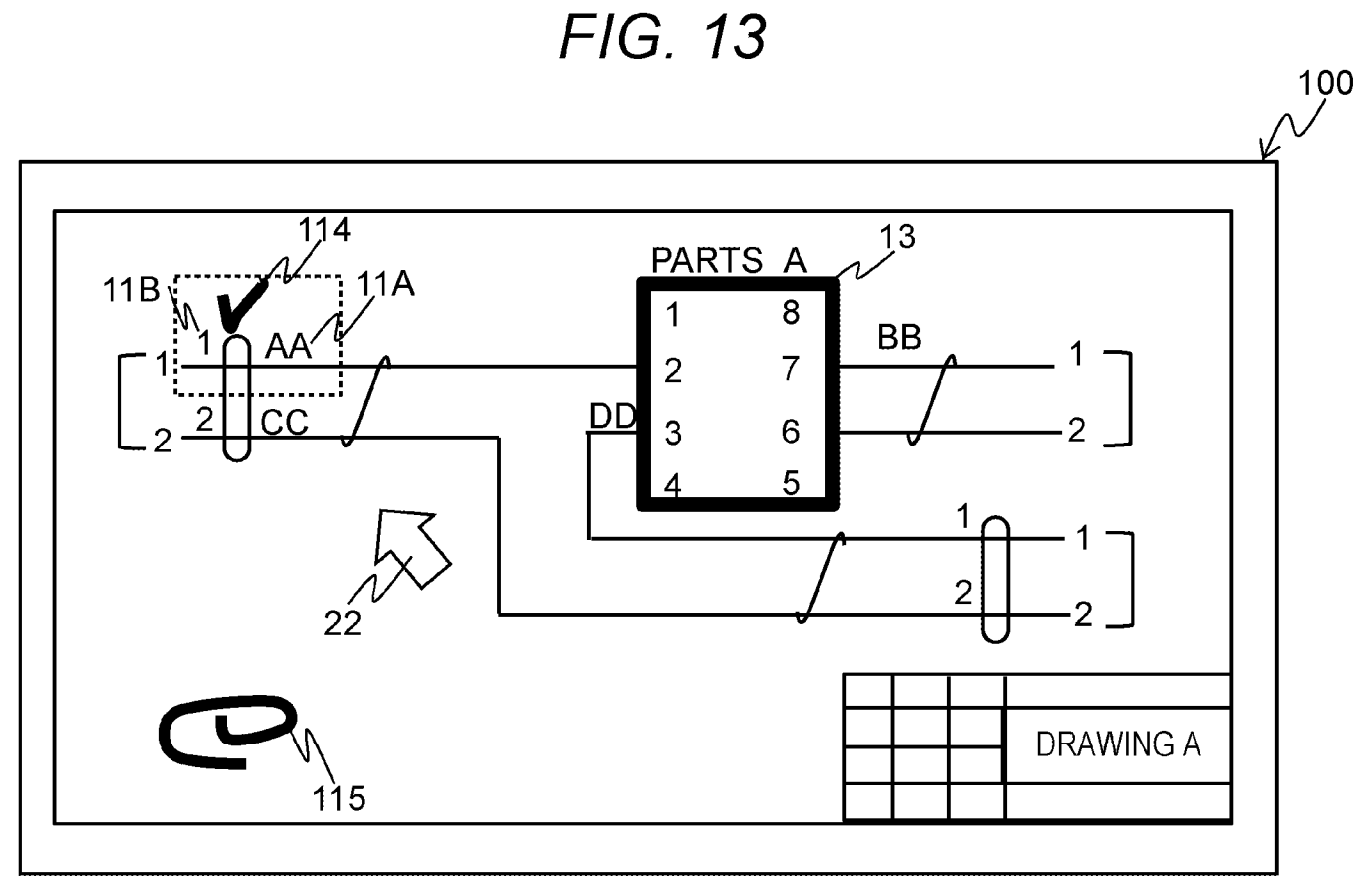

FIG. 13 is a diagram illustrating screen display to be presented to the user after the processing of the work completion determination unit.

The part-related handwriting extraction unit 232 processes the handwritings that are not present on the parts, such as the handwriting 114 and the handwriting 115, and extracts writing candidates for the part.

Figure 14:
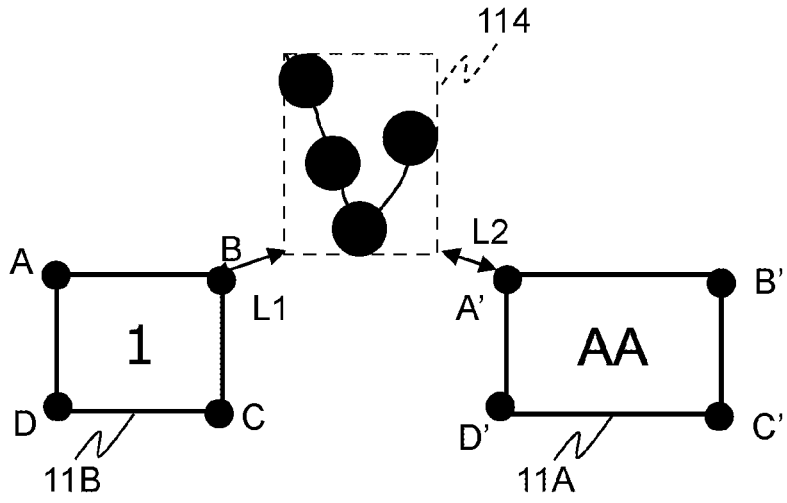
FIG. 14 is a diagram illustrating means for associating the handwriting not on the part with the part.

FIG. 14 is a diagram illustrating means for associating the handwriting not on the part with the part.

The part-related handwriting extraction unit 232 determines whether or not the handwriting is the writing candidate for the part by comparing distances L1 and L2 between bounding boxes of the handwriting and the character from a bounding box which is a region including the point group of the handwriting 114 and bounding boxes of the characters 11A and 11B.

Figure 15:
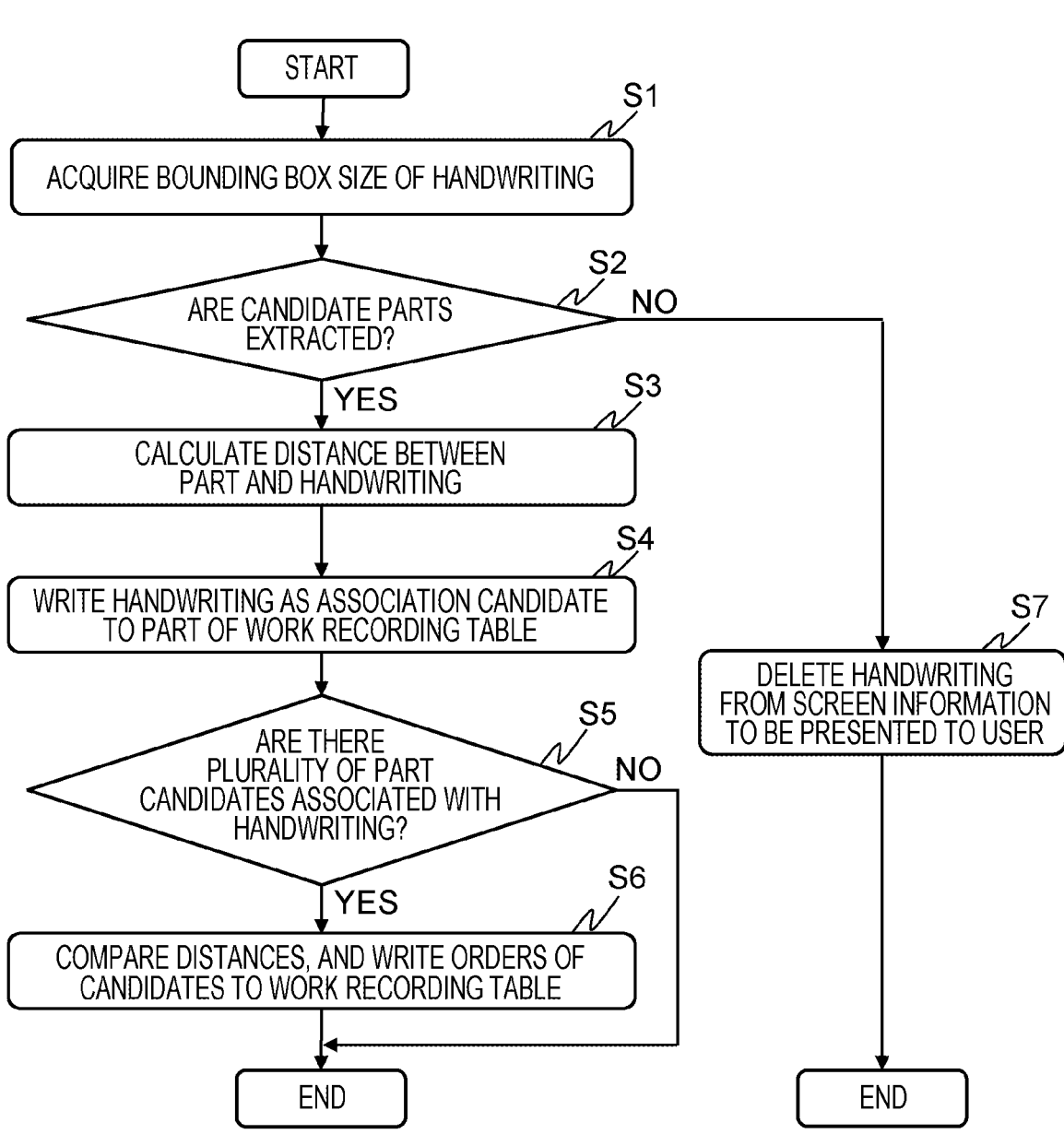
FIG. 15 is a diagram illustrating a flow of a determination method for extracting writing candidates for the part.

FIG. 15 is a diagram illustrating a flow of a determination method for extracting the writing candidates for the part.

First, the part-related handwriting extraction unit 232 detects a start point and an end point of a bounding box from point group data of the handwriting data table 211 (S1). Specifically, the part-related handwriting extraction unit 232 determines a start point and an end point from a minimum value and a maximum value of each of an x coordinate and a y coordinate of the point group. In the coordinates, a lower left of each of the character information and the drawing symbol information may be an origin, and a side close to the lower left may be a start point. In a case where the start point and the end point are determined, the part-related handwriting extraction unit 232 calculates a width in the x direction and a height in the y direction of the bounding box of the handwriting.

Subsequently, the part-related handwriting extraction unit 232 extracts a candidate part by using the calculated width in the x direction and height in the y direction of the bounding box of the handwriting (S2). At this time, the part-related handwriting extraction unit 232 determines the part within a predetermined range from the handwriting. Specifically, the handwriting display determination unit 230 expands a region of the width and the height of the handwriting in upper, lower, left, and right oblique directions from the bounding box of the handwriting of the user themselves, and searches for a part that enters the expanded region. That is, the handwriting display determination unit 230 determines a part in a region around a rectangular region including the point group coordinates of the handwriting. In a case where the part is present in a region within an expanded predetermined range, the part-related handwriting extraction unit 232 calculates a distance between the part and the handwriting by using coordinates of a closest corner of the handwriting and the part (S3). The handwriting display determination unit 230 may determine that handwritings within a predetermined range from the part are the writing candidates. The predetermined region is a region obtained by expanding a region equivalent to a rectangular region including the point group coordinates of the handwriting around a rectangular region in upper, lower, left, and right oblique directions to come into contact with the rectangular region.

Subsequently, the part-related handwriting extraction unit 232 writes the handwriting as the writing candidate to the part in the work record table 213 (S4). A description method in the work record table 213 will be described later. Further, in a case where there is a plurality of part candidates associated with the handwriting, the part-related handwriting extraction unit 232 compares distances (S5). The part-related handwriting extraction unit 232 compares the distances, and writes order information to the work record table 213 such that a first place is given to a handwriting having a shortest distance from the part and a second place is given to a handwriting having a second shortest distance (S6). At this time, not only the order information but also distance information may be written to the work record table 213 so as to be utilized.

Since the handwriting determined as NO in the determination of S2 is not the candidate associated with the part, the work completion determination unit 231 deletes the handwriting from the screen information to be presented to the user (S7). The handwriting to be deleted corresponds to, for example, the handwriting 115 illustrated in FIG. 12. The handwriting 115 is a memo and is not related to the work record of the part. Thus, the display is deleted from the screen to be presented to the user, and thus, it is possible to prevent erroneous association with the part.

FIG. 16 is a diagram illustrating information of the work record table after the processing is performed by the handwriting display determination unit.

In the work record table 213, the information included in the part includes at least one of the presence or absence of the association and the presence or absence of the writing candidate. In a case where the handwriting is selected as the writing to be associated with the part in the data display unit 400 of the terminal of the user, the work record table update unit 270 updates the work record table 213 in association with the part with the selected writing. Specifically, in a case where the handwriting is associated with the part, the work record table update unit 270 displays the candidate in a column of the handwriting ID, and changes the notation to distinguish from an actual associated handwriting. For example, in the present embodiment, since the handwriting is still a candidate, the handwriting is distinguished by using parentheses. Regardless of the parentheses, any method that can be distinguished from the actual association may be used, and other symbols may be used, or numbers or symbols may be used in a header of the notation. Further, a candidate handwriting ID is written to the work record table 213, and in a case where the same candidate handwriting ID is also present in other parts, the order is written. In the present embodiment, only the order is illustrated. However, distance information may be assigned.

Further, in FIG. 14, the handwriting was used as the bounding box, and comparison with the bounding box of the part was performed. However, one point of the point group of the handwriting may be used for comparison.

Figure 17:
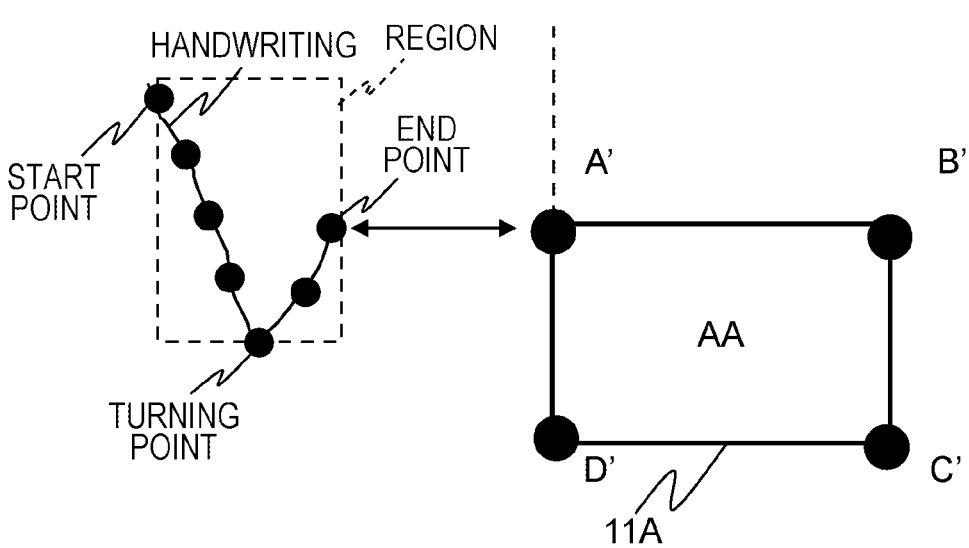
FIG. 17 is a diagram illustrating an example of association means with the part with one point of the handwriting as a reference.

FIG. 17 is a diagram illustrating an example of means for associating the handwriting with the part with one point of the handwriting as a reference.

In FIG. 17, the distance is calculated by comparing end point coordinates of the handwriting with a corner A' of the character 11A. As illustrated in FIG. 14, when the handwriting is regarded as the bounding box, it is not possible to compare points at positions of sides of the bounding box. It is possible to more accurately calculate the distance between the handwriting and the part by performing comparison points of the handwriting. As a calculation method, first, as illustrated in S2 of FIG. 15, the part-related handwriting extraction unit 232 extracts whether there is the candidate part associated with the periphery of the handwriting. The part-related handwriting extraction unit 232 does not compare all the points of the handwriting for the extracted part, but calculates a shortest distance between the point of the handwriting and the corner of the part by using a start point, an end point, or a turning point of a handwriting having a possibility of being an edge point based on a positional relationship between the handwriting and the part. In the example of FIG. 17, since the character 11A is on a right side of the handwriting, the distance between the end point of the handwriting and A' that is the corner of the closest part is calculated by using the end point coordinates of the handwriting. Note that, in the calculation of the distance from the handwriting, not only the corner of the part region but also the point in the part region may be compared.

Figure 18:
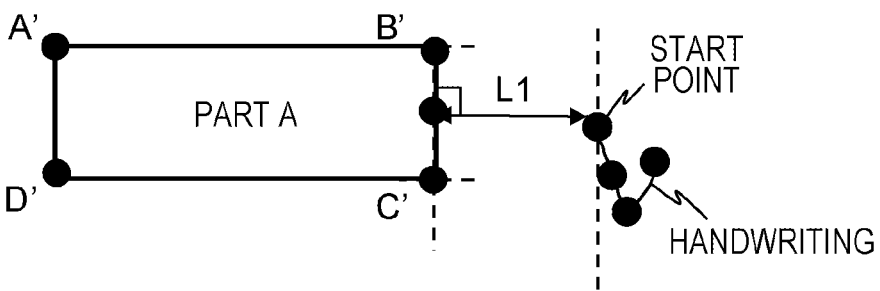
FIG. 18 is a diagram illustrating an example in which a distance from the handwriting is calculated by using a portion other than a corner of a part region.

FIG. 18 is a diagram illustrating an example in which the distance to the handwriting is calculated by using a portion other than the corner of the part region.

The part-related handwriting extraction unit 232 performs calculation with the start point of the handwriting as a reference. The part-related handwriting extraction unit 232 sets the coordinates of the start point to (xhs, yhs) and sets the coordinates of the corner of the part to B' (xpb, ypb) and C' (xpc, ypc). In the case of a relationship of ypc<yhs<ypb, a distance perpendicular to a line segment B'C' from the start point is a shortest distance between the start point of the handwriting and the part. Thus, the distance is calculated as L1=xhs−xpb (=xpc). As described above, the coordinates of the corner of the part region are used for calculation, and in actual distance calculation, an accurate distance can be calculated by using the point in the region.

Next, a screen example on the UI displayed in the emphasizing manner by the selected handwriting and part emphasizing unit 280 will be described.

Figure 19:
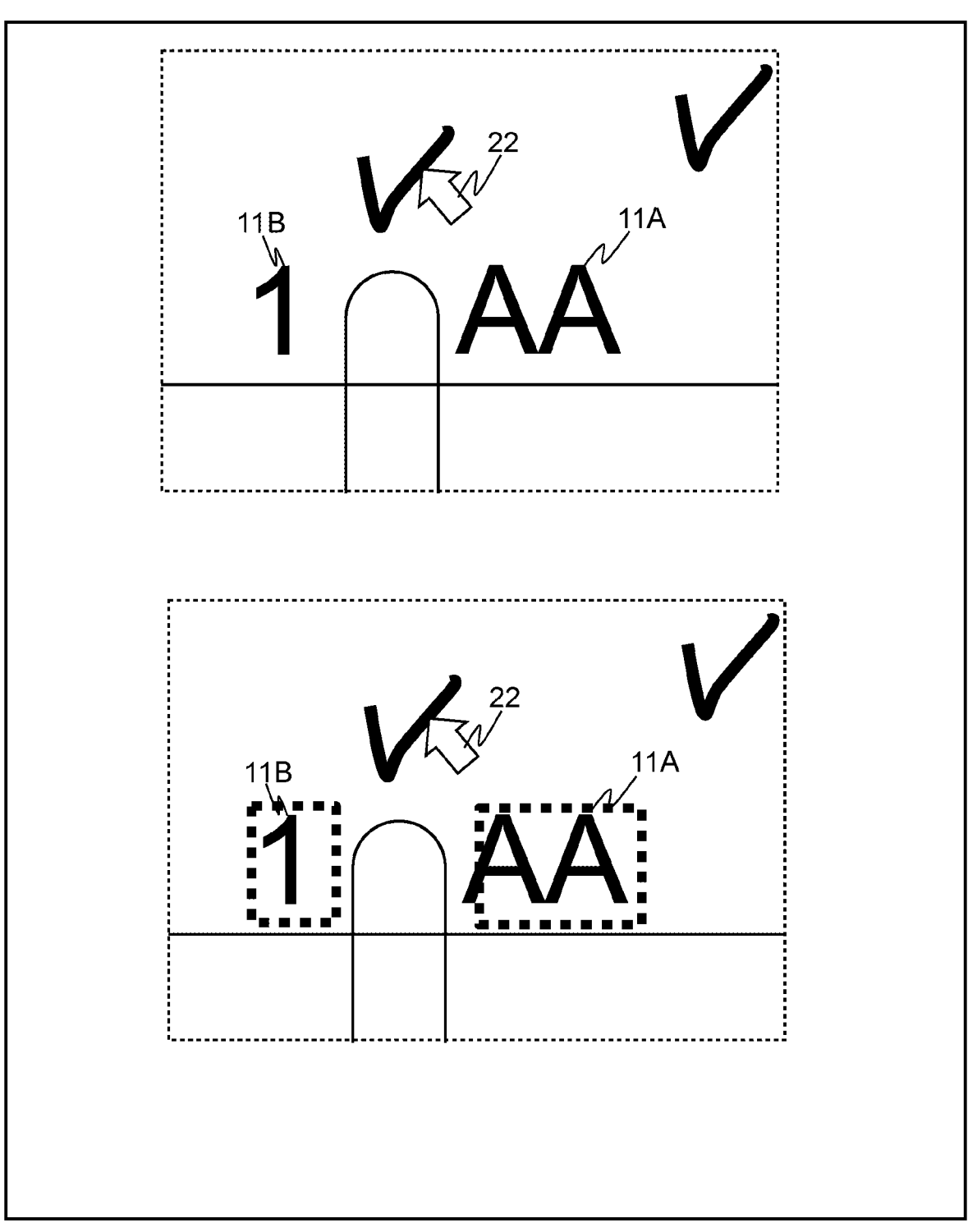
FIG. 19 is a diagram illustrating display examples on the UI before and after handwriting selection of the user.

FIG. 19 is a diagram illustrating display examples on the UI before and after the handwriting selection of the user.

An upper side illustrates UI display before the user selects the handwriting, and a lower side illustrates UI display after the user selects the handwriting.

When the user selects the handwriting, the display control unit 240 displays the characters 11A and 11B that are associated candidates in the emphasizing manner. In FIG. 19, a frame is indicated by a dotted line. However, the handwriting may be performed by being painted in a semitransparent manner or may be performed by changing a character color. Any part may be used as long as the part is emphasized unlike other parts. The part to be associated becomes clear by performing such displaying in the emphasizing manner, and thus, it is possible to perform accurate association by limiting the selection of the user. Further, when there are a plurality of candidates, the UI display of the part may be changed by the order information or the distance information. Since there is a high possibility that a part with a short distance is a part to be associated, for example, as a distance becomes longer by changing a transmittance of color painting, a high transmittance is given to a part. A part with a high probability may be expressed in red, and a part with a low probability may be expressed in blue. Further, the display control unit 240 may not to be able to select a part other than the part candidate. As described above, since the handwriting other than on the part is performed on the periphery of the part, even though a part that is not the part candidate is selected, reaction is not caused. Accordingly, it is also effective to prevent erroneous association.

In the example of FIG. 19, the handwriting is selected first, but the handwriting to be an association candidate may be displayed in the emphasizing manner, or the color or transmittance may be changed in accordance with the distance similarly to a case where the part is selected first. Further, even in the case of handwriting present in the periphery of another part, since display is unnecessary in a case where another part is associated, handwriting other than a target handwriting may not be displayed.

Second Embodiment

Hereinafter, a second embodiment of the present invention will be described.

Figure 20:
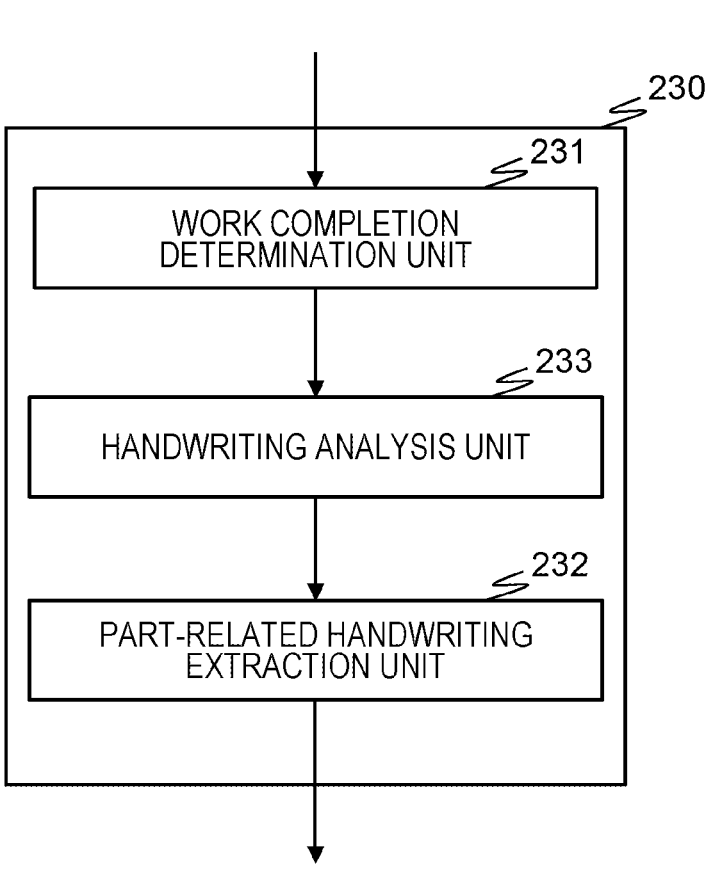
FIG. 20 is a diagram illustrating a configuration of a handwriting display determination unit according to a second embodiment.

FIG. 20 is a diagram illustrating a configuration of a handwriting display determination unit according to the second embodiment.

The second embodiment is different from the first embodiment only in that a handwriting analysis unit 233 is added to the handwriting display determination unit 230 from the configuration of the first embodiment, and other processing is similar to the first embodiment.

Hereinafter, an operation of the handwriting analysis unit 233 will be described.

Recording of a character and a drawing symbol is often performed with a check mark, and a work record of a wiring is often written with one long line. An object of providing the handwriting analysis unit 233 is to accurately associate a handwriting with a part by utilizing features of such a recording method.

Figure 21:
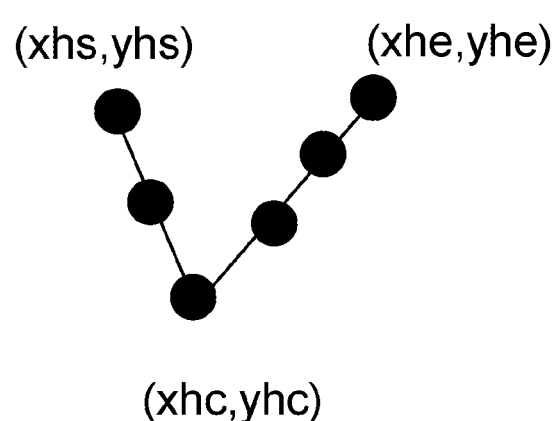
FIG. 21 is a diagram illustrating point group data when a check mark is written by handwriting.

FIG. 21 is a diagram illustrating point group data when a check mark is written by a handwriting.

The start point is (xhs, yhs), the turning point is (xhc, yhc), and the end point is (xhe, yhe). A point at which the check mark is detected is whether or not the start point and the turning point, and the end point and the turning point are written in a form close to straight lines and include two straight lines. For example, it is necessary to distinguish from a case where a handwriting such as W and a wavy line are written.

Slopes of the start point and the turning point, and the end point and the turning point are obtained as follows.

A slope of the start point and the turning point:

$$Aslope = (yhc − ysh)/(xhc − xhs),$$

A slope of the end point and the turning point:

$$Bslope = (yhe − yhc)/(xhe − xhc)$$

The handwriting analysis unit 233 calculates slopes of all points present between the start point and the turning point and the start point for the slope Aslope, compares all the calculated slopes with Aslope, and regards that a portion from the start point to the turning point is written as a straight line in a case where there is a difference in a slope of only about 10%. The handwriting analysis unit 233 also calculates slopes of all points present between the end point and the turning point and the end point for Bslope, compares all the calculated slopes with Bslope, and regards that a portion from the end point to the turning point is written as a straight line in a case where there is a difference in a slope of only about 10%. By doing this, the handwriting analysis unit 233 analyzes the check mark.

FIG. 22 is a diagram illustrating a handwriting internal table.

The handwriting data table 211 read by the handwriting display determination unit 230 is referred to as the handwriting internal table.

After the handwriting is analyzed as the check mark, the handwriting analysis unit 233 adds the association target to the handwriting internal table that incorporates the handwriting data table 211 in order to pass information indicating that the character and the drawing symbol are the association targets to the part-related handwriting extraction unit 232 in a subsequent stage. The part-related handwriting extraction unit 232 performs processing of associating the check mark and the analyzed handwriting with the character and the drawing symbol by looking at the handwriting internal table. Further, in the case of one long wiring as in the handwriting 112 of FIG. 3, in a case where a length exceeds twice the bounding box of a surrounding character and drawing symbol, the association target may be recorded as the wiring in the handwriting internal table.

Further, in a case where the handwriting written around the part on the drawing 100 is not used for the work record, the display method of the handwriting may be changed.

Figure 23:
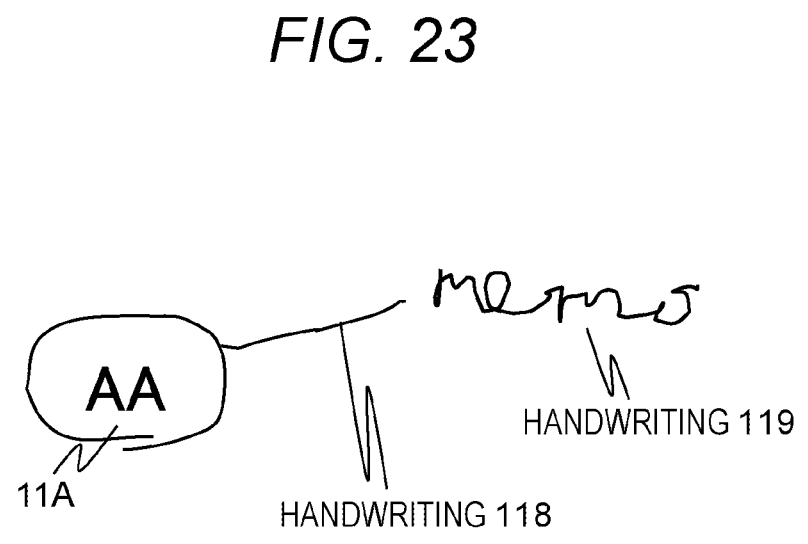

FIG. 23 is a diagram illustrating an example in which a comment is written on a character by a lead line.

A comment on the character 11A is recorded as work information accompanying the character 11A regardless of the work record.

The processing of the comment on the character will be described below.

First, the handwriting analysis unit 233 confirms whether or not a handwriting data 118 as an example of "writing" includes a character, a drawing symbol, and a wiring in a bounding box. In a case where the handwriting data includes the character, the drawing symbol, and the wire, the handwriting analysis unit 233 confirms a periphery of end point coordinates of the handwriting data 118 and confirms whether or not there is handwriting nearby. The distance from the end point may be within a width of one standard character size on the drawing. Since there is a handwriting 119 as an example of "writing" at a position close to the end point, the handwriting analysis unit 233 writes, as a comment related to the character 11A, the handwriting 119 to the work record table 213.

FIG. 24 is a diagram illustrating a work record table reflecting a comment.

In the work record table 213, the information included in the part includes at least one of presence or absence of the association, presence or absence of the writing candidate, and the comment on the part. Specifically, the handwriting 119 corresponding to the handwriting ID by commenting on the part is described in the work record table 213. A comment is described in parentheses. However, the present invention is not limited to the present description, and other description methods may be used as long as the description is different from the association and the candidate handwriting.

As described above, the handwriting analysis unit 233 of the handwriting display determination unit 230 operates.

What is claimed is:

1. A work assistance system comprising:
   a drawing in which parts and handwritings are included;
   a work record table that stores, as work records, the handwritings for the parts;

a handwriting display determination unit that determines that the handwritings not associated with the parts are writing candidates based on the work record table; and a display control unit that displays the writing candidates and the parts on a display unit of a terminal of a user, wherein the display control unit displays, as the writing candidates to be associated with a respective one of the parts, the writing candidates and the parts in a selectable manner on the display unit of the terminal of the user.

2. The work assistance system according to claim 1, wherein the handwriting display determination unit determines that the handwritings in a predetermined range from the respective one of the parts are the writing candidates.

3. The work assistance system according to claim 1, wherein the handwriting display determination unit includes a work completion determination unit that determines that the handwritings not associated with the parts in the work record table are the writing candidates.

4. The work assistance system according to claim 1, wherein the handwriting display determination unit includes a part-related handwriting extraction unit that calculates a distance between point group coordinates of a handwriting of the handwritings and a point with, as a reference, a corner of a region including the respective one of the parts close to the point group coordinates, and extracts the writing candidate for which the calculated distance is in a predetermined range.

5. The work assistance system according to claim 4, wherein the predetermined range is a region obtained by expanding a region equivalent to a rectangular region including the point group coordinates of the handwriting of the handwritings to bring into contact with a rectangular region including a respective one of the parts around the rectangular region including the point group coordinates of the handwriting of the handwritings in upper, lower, left, and right oblique directions.

6. The work assistance system according to claim 1, further comprising:

a work record table update unit that, in a case where a writing candidate of the writing candidates to be associated with the respective one of the parts is selected by the user via input means on the display unit of the terminal of the user, updates the work record table by associating the respective part with the selected writing candidate.

7. The work assistance system according to claim 1, wherein at least one of presence or absence of the association, presence or absence of a writing candidate of the writing candidates, and a comment on the respective one of the parts is included as information included in the respective part in the work record table.

8. The work assistance system according to claim 1, further comprising:

the display control unit displaying a respective one of the parts in an emphasizing manner by changing a color and a transmittance of the respective one of the parts or a writing candidate of the writing candidates based on the work record table in a case where the respective part or the writing candidate is selected by the user via input means on the display unit of the terminal of the user.

9. The work assistance system according to claim 4, wherein the part-related handwriting extraction unit calculates a distance from a reference point of a writing candidate of the writing candidates with, as a reference, a point on one side of a region of the respective one of the parts in a case where an x coordinate or a y coordinate of the reference point of the writing candidate between coordinates of a first corner and a second corner as both ends of the one side.

10. The work assistance system according to claim 4, wherein the part-related handwriting extraction unit uses a reference point of a writing candidate of the writing candidates to any one of a start point, an edge point including a turning point, and an end point among the point group coordinates of the writing candidate.

11. The work assistance system according to claim 4, wherein the handwriting display determination unit includes a handwriting analysis unit that outputs the parts with which a writing candidate of the writing candidates is to be associated by narrowing down the parts to two or less of a character, a wiring, and a drawing symbol to the part-related handwriting extraction unit.

12. The work assistance system according to claim 11, wherein the handwriting analysis unit detects that the handwriting candidate is a check mark.

13. The work assistance system according to claim 11, wherein the handwriting analysis unit analyzes a connection handwriting present between the respective one of the parts and a handwriting separated from the respective part, and records, as related information, the respective part and the handwriting in association with each other in the work record table.

14. A work assistance method causing a work support system to execute:

determining that, based on a work record table that stores, as work records, handwritings for parts constituting a drawing displayed on a terminal of a user, the handwritings not associated with the parts are writing candidates; and displaying the writing candidates and the parts on a display unit of the terminal of the user, wherein in the displaying of the writing candidate and the part, the writing candidates and the parts are displayed as the writing candidates to be associated with the respective one of the parts in a selectable manner on a display unit of the terminal of the user.

\* \* \* \* \*